United States Patent Office 3,751,520
Patented Aug. 7, 1973

---

3,751,520
POLYURETHANE COMPOSITIONS CONTAINING POLYVINYLIDENE FLUORIDE
Toshio Yasuda, Tokyo, Japan, assignor to BASF Wyandotte Corporation, Wyandotte, Mich.
No Drawing. Continuation-in-part of application Ser. No. 84,144, Oct. 26, 1970. This application Feb. 7, 1972, Ser. No. 224,312
Claims priority, application Japan, Oct. 27, 1969, 44/85,914
Int. Cl. C08g *41/04*
U.S. Cl. 260—859 R    4 Claims

---

ABSTRACT OF THE DISCLOSURE

The coefficient of friction of a polyurethane elastomer is reduced by adding thereto from about 5 parts to about 20 parts by weight based on the total weight of the resulting composition of a homopolymeric vinylidene fluoride resin.

---

This invention relates generally to polyurethane elastomers and more particularly to thermoplastic polyurethanes having an improved coefficient of friction. This application is a continuation-in-part of my application S.N. 84,144 filed Oct. 26, 1970 now abandoned.

Polyurethanes which can be shaped by injection, extrusion and blowing or rolling are used extensively for making small elastic mechanical parts which must have high mechanical strength and super wear resistance. Such parts can be manufactured by mass production methods. However, the thermoplastic polyurethane compositions which have been available have the disadvantage of a poor coefficient of friction which is in the range from 0.6 to 0.2 depending upon its hardness of from Shore A 75° to Shore D 75°. The hardness of a polyurethane is somewhat different from that of general rubber.

Although the thermoplastic polyurethane rubber is a material of strong impact resistance, it generates high frictional heat when it is subjected repeatedly to impact energy. The heat is caused by its frictional force and such heat generated is higher than that of other materials of low frictional force. Hence, the thermoplastic polyurethane rubber deteriorates rapidly and is destroyed due to its low heat resistance property which is its weakest characteristic when it is subjected to repeated impact energy. It is necessary to reduce the coefficient of friction as much as possible to prevent such a phenomenon. At the same time, since wear attributes to the mechanical strength of the material, the material having the lower coefficient of friction must be more resistant against wear. There are several materials which have been suggested as additives for reducing coefficient of friction of thermoplastic polyurethane rubber. For example, tetrafluoroethylene resin, tetrafluoroethylene-hexafluoropropylene copolymer and vinylidenefluoride resin are suitable fluoro resins. Polyamides and polyacetals etc. may also be used. Tetrafluoroethylene resin and tetrafluoroethylene-hexafluoropropylene copolymer possess very low coefficient of friction, but they belong to the type of alien substance mixture and are deficient in stability which may possibly cause deterioration of the mechanical property of the polyurethane. The materials which are mutually soluble or partially mutually soluble are vinylidenefluoride resin, polyacetal resin, vinyl chloride resin, ABS resin, styrene resin etc. Their solubility parameters are near to 10. Among the above materials the vinylidenefluoride contributes best to the reduction of coefficient of friction of thermoplastic polyurethane rubber or elastomer as can be seen with reference to the following table showing comparison of coefficient of friction of several kinds of blended polymers.

| Specimen | Hardness | Coefficient of friction | Additive,[1] percent |
|---|---|---|---|
| Thermoplastic polyurethane: | | | |
| A | Shore A 95° | 0.3 | 5 |
| B | do | 0.25 | 10 |
| C | Shore A 96° | 0.15 | 20 |
| D | Shore D 68° | 0.08–0.09 | 5 |
| E | Shore D 69° | 0.07–0.08 | 10 |
| Tetrafluoroethylene resin | Shore D 65° | 0.04 | |
| Tetrafluoroethylene plus hexafluoropolypylene copolymer | Shore D 70° | 0.06 | |
| Polyacetal resin | Shore D 80° | 0.14 | |
| Thermoplastic polyurethane rubber | Shore D 68° | 0.13 | |

[1] Vinylidene fluoride resin.

The object of the present invention is to improve the coefficient of friction of the aforementioned general polyurethane rubbers or elastomers.

In accordance with the present invention the foregoing object is achieved by providing a polyurethane elastomer composition of 100 parts in total weight with about 5 to 20 parts in weight of vinylidenefluoride resin and about 95 to 80 parts in weight of substantially non-porous thermoplastic polyurethane polymer.

Five practical examples are shown below with detailed explanation respectively.

EXAMPLE 1

To 100 grams linear polyester of 2000 molecular weight, 56 hydroxyl number of about 2 acid number which is the esterification product of a mixture of adipic acid and ethylene glycol admix 16 grams 1–4 butanediol and 8.6 grams vinylidenefluoride resin at a temperature of 105° C. and immediately react with 60 grams diphenylmethane-4,4′-diisocyanate. Pour the reacted product while still in the liquid state on a heating plate (110° C.) and leave it for 10 minutes at that temperature. Then keep it for 48 hours at room temperature and granulate the resulting product to obtain a material useful for injection molding or extrusion on a machine.

The properties of the material produced with the process are as shown in the table below:

| Test item | Indication | Test method | Value |
|---|---|---|---|
| Hardness | HS | JIS–K6301 | 95° +2, −4 |
| Specific gravity | G./cm.[2] | JIS–Z8807 | 1.22 |
| Tensile strength | Kg./cm.[2] | JIS–K6301 | 450 |
| Elongation | Percent | JIS–K6301 | 500 |
| Repulsion elasticity | do | DIN–53512 | 35 |
| Coefficient of friction | ([1]) | Bowden Leven friction tester. | 0.25 |

[1] 500 grams load and 5 mm. steel ball.

EXAMPLE 2

To 100 grams linear polyester of 2000 molecular weight, 56 hydroxyl number and about 2 acid number which is a mixture of adipic acid and ethylene glycol admix 16 grams 1,4-butane-diol and 17.27 grams vinylidenefluoride resin at a temperature of 105° C. and immediately react with 60 grams diphenylmethane-4,4′-diisocyanate. Pour the reacted product while still in a liquid state on a heating plate (110° C.) and leave it for 10 minutes at that temperature. Maintain it for 48 hours at room temperature and then granulate the substituted product to obtain a material useful for injection molding or extrusion on a machine.

The properties of the material produced with the process are as shown in the table below:

| Test item | Indication | Test method | Value |
|---|---|---|---|
| Hardness | HS | JIS-K6301 | 95°±2° |
| Specific gravity | G./cm.² | JIS-Z8807 | 1.23 |
| Tensile strength | Kg./cm.² | JIS-K6301 | 570 |
| Elongation | Percent | JIS-K6301 | 480 |
| Repulsion elasticity | do | DIN-53512 | 33 |
| Coefficient of friction | (¹) | Bowden Leven friction tester. | 0.15 |

¹ 500 grams load and 5 mm. steel ball.

EXAMPLE 3

To 1000 grams of a dehydrated linear polycaprolactone ester of 2000 molecular weight and 56 hydroxyl number admix at a temperature of 110° C. 320 grams 1,4-butanediol and 240 grams vinylidenefluoride resin and react with 1100 grams diphenylmethane-4,4'-diisocyanate at a temperature of 82° C. After agitating the mixture for about 2 minutes, pour the partially reacted product while still in a liquid state on a heating plate and leave it for 10 minutes at a temperature of 115° to 120° C. Then granulate the hardened product.

The properties of the material produced with the process are as shown in the table below:

| Test item | Indication | Test method | Value |
|---|---|---|---|
| Hardness | Shore D | ASTM-D1484 | 68°±3° |
| Specific gravity | G./cm.² | JIS-Z8807 | 1.24 |
| Tensile strength | Kg./cm.² | JIS-K6301 | 460 |
| Elongation | Percent | JIS-K6301 | 330 |
| Coefficient of friction | (¹) | Bowden Leven friction tester. | 0.08-0.09 |

¹ 500 grams load and 5 mm. steel ball.

EXAMPLE 4

To 1000 grams dehydrated linear polycaprolactone of 2000 molecular weight and 56 hydroxyl number admix at a temperature of 110° C. 320 grams 1,4-butanediol and 480 grams vinylidenefluoride resin and react with 1100 grams diphenylmethane-4,4'-diisocyanate at a temperature of 82° C. After agitating the mixture for about 2 minutes, pour the reacted product while still liquid on a plate and leave it for 10 minutes at a temperature within the range of from 115° to 120° C. Then granulate the hardened product.

The properties of the material produced with the process are as shown in the table below:

| Test item | Indication | Test method | Value |
|---|---|---|---|
| Hardness | Shore D | ASTM-D1484 | 68°±3° |
| Specific gravity | G./cm.² | JIS-Z8807 | 1.24 |
| Tensile strength | Kg./cm.² | JIS-K6301 | 490 |
| Elongation | Percent | JIS-K6301 | 310 |
| Coefficient of friction | (¹) | Bowden Leven friction tester. | 0.07-0.08 |

¹ 500 grams load and 5 mm. steel ball.

EXAMPLE 5

To 1000 grams of linear polyester of 2000 molecular weight, 56 hydroxyl number and about 2 acid number which is a mixture of adipic acid and ethylene glycol admix 160 grams 1,4-butanediol at a temperature of 105° C. and immediately react with 600 grams diphenylmethane-4,4'-diisocyanate. Pour the reacted product while still in a liquid state on a heating plate (110° C.) and leave it for 10 minutes at the temperature. Maintain it for 48 hours at room temperature and then granulate the substituted product. Subsequently, mix 600 grams of the granulated material with 100 grams of powder or pellets of vinylidenefluoride resin by the use of an extruding machine for making polymer blending and then pelletize the product by a pelletizing machine.

The properties of the material produced with the above method are substantially the same as those of the table of Example 1. Any mixing machine with suitable design can be utilized for the mixing operation of materials involved in the process of the present invention.

The test results with Bowden Leven Friction Tester on solid thermoplastic polyurethane rubber, solid fluoro resin, fluoro resin blended with thermoplastic polyurethane rubber or elastomer, polyacetal resin etc. as well as the composition of thermoplastic polyurethane rubber blended with vinylidenefluoride resin by the method of the present invention are as shown in the table of the preamble of this specification.

The composition of thermoplastic polyurethane rubber and vinylidenefluoride resin as produced with the method of the present invention is effective to prolong and maintain a long life of it when used against movement of relative friction since the inferior thermal property of thermoplastic polyurethane rubber, which is the short point of the material, can be improved by attaining a low coefficient of friction.

I claim:

1. A polyurethane elastomer composition having an improved coefficient of friction comprising based on 100 parts by weight (a) from about 5 parts to about 20 parts of homopolymeric vinylidene fluoride resin, and (b) from about 95 parts to 80 parts of a polyurethane elastomer.

2. The elastomer of claim 1 wherein the polyurethane is a polyesterpolyurethane.

3. The elastomer of claim 2 wherein the polyesterpolyurethane is a polycaprolactone polyurethane.

4. A method of reducing the coefficient of friction of a polyurethane elastomer and thereby improving the heat stability thereof which comprises adding to said elastomer from about 5 parts to about 20 parts by weight based on 100 parts by weight of the resulting composition of homopolymeric vinylidene fluoride resin.

References Cited

UNITED STATES PATENTS 3,008,917   11/1961   Park _____ 260—859

FOREIGN PATENTS 841,197   7/1960   Great Britain.
1,138,474   1/1969   Great Britain.

PAUL LIEBERMAN, Primary Examiner

U.S. Cl. X.R.

260—77.5 CR, 77.5 SS, 858, 859 PV